United States Patent [19]

Shimada

[11] Patent Number: 4,795,215
[45] Date of Patent: Jan. 3, 1989

[54] AUTOMOTIVE SEAT

[75] Inventor: Makoto Shimada, Akishima, Japan

[73] Assignee: Tachi-S Co., Ltd., Akishima, Japan

[21] Appl. No.: 139,002

[22] Filed: Dec. 29, 1987

[51] Int. Cl.$^4$ ............................................. A47C 7/02
[52] U.S. Cl. ....................................... 297/452; 5/474;
 297/455; 297/458; 297/DIG. 1
[58] Field of Search ............... 297/455, 458, 459, 452,
 297/DIG. 1; 5/464, 470, 448, 474

[56] References Cited

U.S. PATENT DOCUMENTS

| | | | |
|---|---|---|---|
| 3,612,607 | 10/1971 | Lohr | 297/DIG. 1 |
| 3,851,920 | 12/1974 | Harris et al. | 297/458 X |
| 3,874,731 | 4/1975 | Jordan | 297/458 X |
| 4,696,516 | 9/1987 | Yeum | 297/458 |
| 4,699,427 | 10/1987 | Kobayashi | 297/DIG. 1 |

Primary Examiner—James T. McCall
Attorney, Agent, or Firm—Oldham & Oldham Co.

[57] ABSTRACT

An automotive seat comprising a main cushion body and a sub cushion body laminated thereupon, wherein each of the main and sub cushion bodies is covered and bonded with its respective covering member, and those separate cushion bodies are further bonded together, to thereby provide an aesthetically improved loose-cushion type of seat.

4 Claims, 2 Drawing Sheets

AUTOMOTIVE SEAT

BACKGROUND OF THE INVENTION

1. Field of the Invention

The present invention relates to a seat for automobiles, and in particular, to a so-called loose-cushion type seat having a decorative sub-cushion member mounted thereon for giving a high easthetic effect to the seat.

2. Description of the Prior Art

In general, a decorative type of cushiony seat having a softer, decoratively effective sub-cushion placed thereupon is referred to as a "loose-cushion seat", which has been accepted as a high commercial value product.

Reference is made to FIG. 1(A), in which a conventional loose-cushion seat of this kind is shown as comprising a main cushion body (10), and a sub cushion body (11) covered at its upper surface with a covering member (12), such that the latter cushion body (11) is secured to the former one (10) by means of an anchor cloth piece (10a), whose one end is sewn to the terminal of a lateral side portion (12a) of the covering member (12) and whose other end passes through the bore of the main cushion body (10) and is fixed to a spring member (14) provided in a frame (13). Numeral (15) denote a decorative button.

FIG. 1(B) shows another conventional loose-cushion seat structure, in which a sub cushion body (11') is secured to a main cushion one (12') by means of a covering member (16) comprising an upper portion (12'), a back cloth (12a'), a first lateral side portion (12b'), and a second lateral side protion (12c'), the upper portion (12') and back cloth (12a') covering the sub cushion body (11') entirely, and the terminal of the second lateral side portion (12c') being fixed to a frame (13) via a hog ring or the like.

Both of the above-stated prior arts, however, have been with such problems as an increased number of materials and assembling steps involved, and a poor, upleasing formation of the lateral surfaces of resultant product. Namely, the first prior art in FIG. 1(A) requires a great number of assembling and sewing steps by the reason of the anchor cloth piece (10a) being extended internally of the cushion bodies (10)(11) together with special sewing requirements for the covering member (12), which is quite time-consuming, and also no technical design is given to attain a good formation of the lateral surfaces of the seat. The second prior art in FIG. 1(B), similarly, encounters numerous sewing and assembling steps, resulting in a bar to speed-up of the assemblage, and is deformed unpleasingly in its lateral surfaces due to the fact that the upper portion (12a') is pulled downwardly with the first and second lateral side portions (12b')(12c').

SUMMARY OF THE INVENTION

With the above-noted drawbacks in view, it is a primary purpose of the present invention to provide a vehicle seat which is of simplified structure easy for its assemblage, and aesthetically improved in the appearance of its lateral surfaces, with a high commercial value.

To achieve the above purpose, the present invention comprises a main cushion body with its own cover member bonded thereon, and a sub cushion body with its own cover member bonded thereon, in such a manner that thus-constructed sub cushion body is further bonded to the upper surface of the preformed main cushion body by means of an adhesive.

It is accordingly appreciated that, because of the individually bonding of a cover member to each of the main and sub cushion bodies, the original outer contours respectively of the main and sub cushion bodies are retained as they are, whereupon the resultant seat with those main and sub cushion bodies bonded together is free from deformation in its lateral surfaces, and thus in the course of assembling process, the seat is produced without any deformation in its lateral surfaces, and without need for sewing process as required, in the prior arts stated above, which makes simplified the seat assembling processes.

Another purpose of the present invention is to provide a vehicle seat of such structure in which its central seating portion is recessed, with both right and left peripheral raised portions formed therearound, for an improved comfortable touch of seating, the structure being particularly so designed that a slab sub-cushion body is easily bonded to a likewise unevenly formed main cushion body in a manner conforming to the outer uneven upper surface of the main cushion body.

To this end, in accordance with the present invention, the slab sub-cushion body is bonded with a covering member except for the central part of its bottom portion. The slab sub-cushion body is previously formed from its flat state into an uneven shape corresponding to that of the main cushion body, and therefore, since the recessed portions of the sub cushion body are at the bottom side thereof not bonded to the covering member, the elastic recovery force into an original flat shape, of the sub cushion body is escaped and reduced, thus not merely preventing the flat-shape recovery of the sub cushion body, but also allowing the uneven shape retainment of the same. Accordingly, the slab sub-cushion body can be bonded as it is to the unevenly formed main cushion body, and as such, there is eliminated any undesired deformation of the sub cushion body.

DETAILED DESCRIPTION OF PREFERRED EMBODIMENTS OF THE INVENTION

Figure 1A:
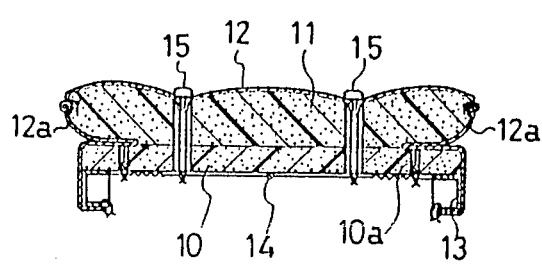
FIG. 1(A) is a longitudinally sectional view of a conventional seat.
Figure 1B:
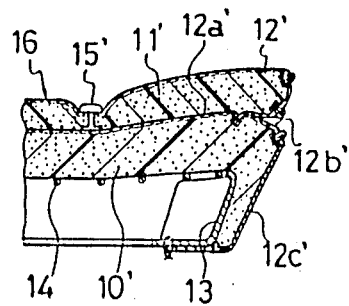
FIG. 1(B) is a partially enlarged sectional view of another conventional seat.
Figure 2:
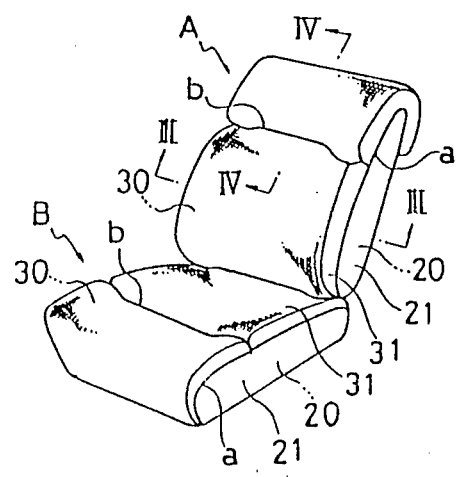
FIG. 2 is a perspective view of a seat in accordance with the present invention.

Referring to FIG. 2, illustrative is an automotive seat in accordance with the present invention. Designations (A) and (B) represent a seat back and seat cushion, respectively. Both of them are of such structure that a sub cusion body (30) with a cover member (31) bonded thereto is integrally bonded to the upper surface (i.e. seating area) of a main cushion body (20) which is also bonded with another cover member (21). Thus, those two cushion bodies (20)(30) are each covered with their respective cover members (21)(31), and there is clearly defined a recessed groove (a) in the boundary between the cushion bodies (20)(30) at both lateral surfaces thereof, giving a decorative effect in the seat. Reference characters (b) in the illustrated emdodiment denote transverse recessed grooves each extending transversely of the sub cushion bodies (30) respectively of the seat back (A) and seat cushion (B).

Figure 3:
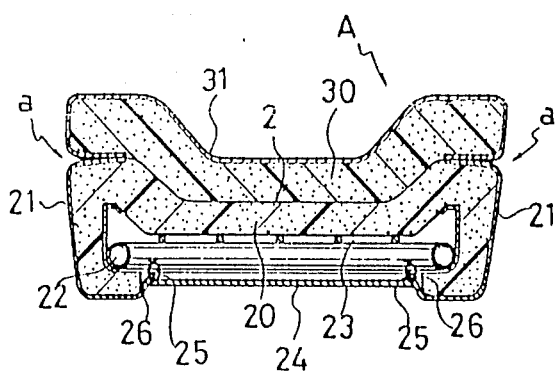
FIG. 3 is a sectional view taken along the line III—III in the FIG. 2.
Figure 4:
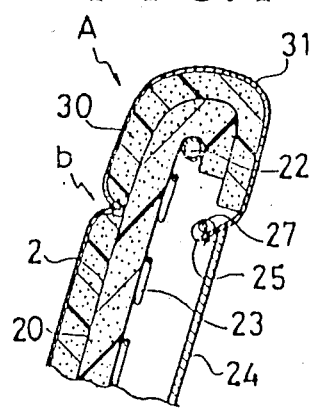
FIG. 4 is a partial sectional view taken along the line IV—IV in the FIG. 2.

FIGS. 3 and 4 shows a structure in section, of the foregoing seat back (A). It is to be seen that the main cushion body (20) is, only at its peripheral and lateral surfaces, covered with and bonded to the covering member (21), and not so done at its central upper surface. The main cushion body (20) is supported by a pipe frame (22) having a spring member (23) (for example, a zig-zag spring) extended therein, and so formed that its upper end portion is turned backwardly around the upper bar section of the frame (22) in such a fashion as to represent a substantially U-shaped configuration. The terminal end of the covering member (21) bonded to the main cushion body (20) is securely anchored by a hog ring (25) fixed to a wire member (26) provided at the bottom side of the seat cushion (B). Numeral (24) denotes a back board.

The sub cushion body (30) is bonded by an adhesive (2) to the upper surface of the main cushion body (20) in conformity with the uneven (i.e. recessed) contour thereof. The upper end portion of the sub cushion body (30) is bent over along that of the main cushion body (20) to extend a short distance over the rear side of the seat back (A). The terminal end of the covering member (31) bonded to the sub cushion body (30) is securely anchored by a hog ring (25) fixed to a wire member (27) which is welded to the frame (22) in a manner extending transversely of the seat back (A).

Figure 5:
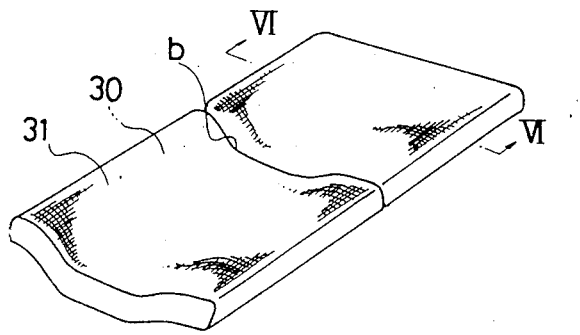
FIG. 5 is a perspective view of a sub cushion body in accordance with the present invention.
Figure 6:
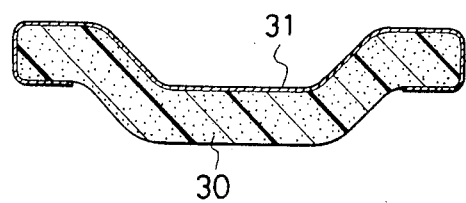
FIG. 6 is a sectional view taken along the line VI—VI in the FIG. 5.

In FIGS. 5 and 6, illustrated specifically is the sub cushion body (30) with its own covering member (31) bonded thereto. The sub cushion body (30) is made of a slab urethane foam material. In this particular embodiment, it is formed in a shape corresponding to that of the upper surface of the main cushion body (20). For that purpose, in accordance with the present invention, a flat shape of slab sub-cushion body (30) is formed by a press working process into such ⌣ shape corresponding to that of the upper surface of the main cushion body (20), and thereafter, the covering member (31) is bonded to the upper surface of the sub cushion body (30). It is then understood that the bonding of the covering member (31) to thus-formed sub cushion body (30) restricts and retains the shape of the body (30) per se. Next, the non-bonded remainder of the covering member (31) is bonded to the lateral surfaces and lower peripheral surfaces of the sub cushion body (30), as best seen in FIG. 6, whereupon the ⌣ shape of the body (30) is retained from many angles, and thus retained more positively, thereby ensuring to prevent its recovery into an original flat shape.

Figure 7:
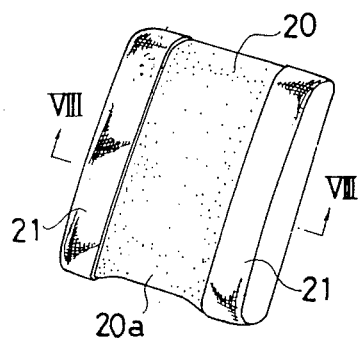
FIG. 7 is a perspective view of a main cushion body in accordance with the present invention.
Figure 8:
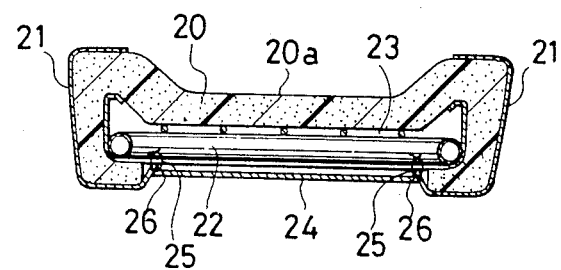
FIG. 8 is a sectional view taken along the line VI—VI.

In FIGS. 7 and 8, there is shown the structure of the main cushion body (20), in which a pair of covering members (21) are bonded to the respective peripheral and lateral surfaces of the main cushion body (30), except that they are not bonded to its central upper portion (20a). The main cushion body (20) is made of urethane foam material, and so formed that its central upper portion (20a) is recessed, with the right and left peripheral portions being raised, thus representing ⌣ shaped configuration.

Thus, after applying the adhesive (2) to the the central upper portion (20a) of the main cushion body (20), the bottom surface of the sub cushion body (30) is pressed against and bonded to the portion (20a).

Accordingly, from the above description, it will be appreciated that, the formation of the seat in the present invention is based upon the bonding of two separate main and sub cushion bodies with their own covering member being previously bonded thereto, which eliminates a sewing operation and avoids the provision of internal anchoring means. Further, siince the sub cushion body is bonded with the covering member in advance before being bonded to the main cushion body, the shape of the sub cushion body is retained in its original shape against deformation in contrast to the prior arts stated above, so that the lateral surfaces of the seat are free from any deformation and undesired creases. In addition, the lamination of the sub cushion body upon the main cushion one permits production of a loose-cushion seat with a high commercial value.

What is claimed is:

1. An automotive seat comprising:
    a main cushion body formed in a predetermined shape by use of a mold, the main cushion body being bonded at its upper peripheral and lateral surfaces with a covering member;
    a sub cushion body made of a slab material, said sub cushion body being bonded at its upper surface, its lateral surfaces and a peripheral portion of its bottom surface, with a covering member;
    said sub cushion body being bonded to an upper surface of said main cushion body; and
    a recessed groove defined in a boundary between the lateral surfaces of said main cushion body and the lateral surfaces of said sub cushion body.

2. The automotive seat as defined in claim 1, wherein said main cushion body is formed in an uneven shape at its upper surface by a mold, and the bottom surface of said sub cushion body is formed in an uneven shape corresponding to the uneven shape of said upper surface of said main cushion body.

3. The automotive seat as defined in claim 1, wherein said sub cushion body is formed in an uneven shape, and is at its entire upper surface, its entire lateral surfaces and the peripheral portion of its bottom surface, covered and bonded with said covering member, to thereby retain the uneven shape of said sub cushion body.

4. The automotive seat as defined in claim 1, wherein a terminal end of said main cushion body is bent over in a direction toward the rear of the seat, by virtue of said sub cushion body with its covering member bonded thereto lying on said main cushion body and being anchored at the rear of said seat.

* * * * *